United States Patent
Wu et al.

(10) Patent No.: US 12,545,898 B2
(45) Date of Patent: Feb. 10, 2026

(54) EFFICIENT AND NON-GENETICALLY MODIFIED IPSC-INDUCED, INDUSTRIALIZED SINGLE CLONE SELECTION PLATFORM, AND USE

(71) Applicant: ALLIFE MEDICINE (ZHUHAI) LIMITED, Guangdong (CN)

(72) Inventors: Lida Wu, Zhuhai (CN); Yuchun Gu, Zhuhai (CN)

(73) Assignee: ALLIFE MEDICINE (ZHUHAI) LIMITED, Zhuhai (CN)

( * ) Notice: Subject to any disclaimer, the term of this patent is extended or adjusted under 35 U.S.C. 154(b) by 0 days.

(21) Appl. No.: 18/512,843

(22) Filed: Nov. 17, 2023

(65) Prior Publication Data

US 2024/0191205 A1 Jun. 13, 2024

Related U.S. Application Data

(63) Continuation of application No. PCT/CN2022/098845, filed on Jun. 15, 2022.

(30) Foreign Application Priority Data

Jun. 30, 2021 (CN) .......................... 202110733296.8

(51) Int. Cl.
| | | |
|---|---|---|
| A61K 35/545 | (2015.01) | |
| C12N 5/00 | (2006.01) | |
| C12N 5/074 | (2010.01) | |
| C12N 15/85 | (2006.01) | |

(52) U.S. Cl.
CPC .......... *C12N 5/0696* (2013.01); *A61K 35/545* (2013.01); *C12N 5/0018* (2013.01); *C12N 15/85* (2013.01); *C12N 2501/602* (2013.01); *C12N 2501/603* (2013.01); *C12N 2501/998* (2013.01); *C12N 2502/1171* (2013.01)

(58) Field of Classification Search
CPC .... C12N 5/0696; C12N 5/0018; C12N 15/85; C12N 2501/602; C12N 2501/603; C12N 2501/998; C12N 2502/1171; A61K 35/545
See application file for complete search history.

(56) References Cited

U.S. PATENT DOCUMENTS

2015/0072417 A1* 3/2015 Yamanaka ........... C12N 5/0696
435/366

OTHER PUBLICATIONS

Moore, J. Creation of Multilineage Adult Stem-Like Cells from Terminally Differentiated Fibroblasts. Virginia Commonwealth University, 2011. (Year: 2011).*
Chlon TM, et al. High-risk human papillomavirus E6 protein promotes reprogramming of Fanconi anemia patient cells through repression of p53 but does not allow for sustained growth of induced pluripotent stem cells. J Virol. Jul. 16, 2014; 88(19):11315-26. doi: 10.1128/JVI.01533-14. (Year: 2014).*
Lee J, Jung SM, Ebert AD, Wu H, Diecke S, Kim Y, Yi H, Park SH, Ju JH. Generation of Functional Cardiomyocytes from the Synoviocytes of Patients with Rheumatoid Arthritis via Induced Pluripotent Stem Cells. Sci Rep. Sep. 9, 2016;6:32669. doi: 10.1038/srep32669. PMID: 27609119; PMCID: PMC5016736. (Year: 2016).*
Tucker, BA. Reprogramming Somatic Cells to Pluripotency: Unveiling the Potential of Induced Pluripotent Stem Cells. Stem Cell Res and Regen Med, Feb. 16, 2024; 7(1):169-170. doi: 10.37532/SRRM. 2024.7(1). 169-170 (Year: 2024).*
Cerneckis J, Cai H, Shi Y. Induced pluripotent stem cells (iPSCs): molecular mechanisms of induction and applications. Signal Transduct Target Ther. Apr. 26, 2024;9(1):112. doi: 10.1038/s41392-024-01809-0. PMID: 38670977; PMCID: PMC11053163. (Year: 2024).*

* cited by examiner

*Primary Examiner* — Peter Paras, Jr.
*Assistant Examiner* — Gillian C. Reglas
(74) *Attorney, Agent, or Firm* — JC ONE WORLD (57) ABSTRACT

Disclosed is an efficient and non-genetically modified iPSC-induced, industrialized single clone selection platform, and a use. The platform can efficiently perform reprogramming, and only requires the use of a minimal number of reprogramming factors (OCT4, SOX2, E6, E7). During the single clone separation stage of the present invention, SSEA4/TRA-1-60 is used as a screening marker, and a large number of single cell clones are obtained by means of flow cytometry. The platform described in the present invention has advantages such as high reprogramming efficiency, high safety, easy operation, and large-scale production.

6 Claims, 7 Drawing Sheets

Specification includes a Sequence Listing.

EFFICIENT AND NON-GENETICALLY MODIFIED IPSC-INDUCED, INDUSTRIALIZED SINGLE CLONE SELECTION PLATFORM, AND USE

SEQUENCE LISTING

The instant application contains a sequence listing which has been submitted electronically in the XML file format and is herein incorporated by reference in its entirety. (Filename: "E6260-10002US01_Sequence-listing.xml"; Date created: Jan. 10, 2024; File size: 7,013 Bytes).

FIELD

The present invention belongs to the field of biomedical technology and relates to an efficient and non-genetically modified iPSC induced, industrialized monoclone selection platform, and its application.

BACKGROUND

In 2006, Takahashi and Yamanaka introduced several transcription factors into differentiated mouse skin fibroblasts and obtained pluripotent stem cells similar to embryonic stem cells (ESCs), known as "induced pluripotent stem cells (iPSCs)" (Takahashi K, Yamanaka S Introduction of pluripotent stem cells from mouse embryonic and adult fibroblast cultures by defined factors [J] Cell, 2006, 126 (4): 663-676). In 2007, Takahashi successfully obtained human iPSCs using human fibroblasts (Takahashi K, Tanabe K, Ohnuki M, et al. Introduction of pluripotent stem cells from adult human fibroblasts by defined factors [J]. Cell, 2007, 131 (5): 861-872.). In the same year, Yu and Thomson et al. reported inducing human iPSCs through different combinations of transcription factors (POU5F1, Sox2, NANOG, and Lin28) (Yu J, Vodyanik M A, Smuga-Otto K, et al. Induced pluripotent stem cell lines derived from human somatic cells [J]. Science, 2007, 318 (5858): 1917-1920).

The successful induction of iPSC has brought breakthrough progress to stem cell research. iPSC not only overcomes ethical controversies and other issues in human ESCs research, but also avoids the problem of lacking human oocytes in nuclear transfer technology. It provides an important research platform for the mechanism of disease occurrence and development, developmental biology research, gene and protein function research, and drug screening research and development. At the same time, it also provides a source of seed cells for the clinical application of regenerative medicine and stem cells. The clinical applications of iPSCs can be divided into three categories: disease models (for studying disease mechanisms and rare disease drug screening), stem cell therapy, and tissue and organ regeneration. Among them, the advantage of using iPSCs to establish disease models is that they carry exactly the same genetic material as patients, have cloning ability, self-renewal, and pluripotent differentiation potential similar to embryonic stem cells, and it overcomes the ethical and technical limitations of specific cell sampling in clinical practice. In the application of stem cell therapy, genetic defects in isolated iPSCs can be first treated with gene targeting, and then induced to differentiate into target progenitor cells or functional cells. These autologous cells can be transmitted to the injured site of the patient through different methods to accelerate tissue repair. In the application of tissue and organ regeneration, iPSCs are induced to differentiate into functional three-dimensional tissues or organs by adding specific biophysical and biochemical inducing factors to the appropriate extracellular microenvironment.

According to different carriers, existing induction methods for iPSC can be divided into integrated and non-integrated types. Among them, integrated reprogramming often utilizes retroviruses, lentivirus carriers, and other methods to achieve gene introduction, integration, and reprogramming. Although this method is efficient, the integration of exogenous viral DNA into the host cell genome is highly likely to lead to abnormal host gene expression, resulting in unstable iPSCs, great potential for cancer transformation, and lack of safety. Non-integrated reprogramming reduces changes in chromosome structure and to some extent reduces the possibility of gene mutations and carcinogenesis, such as adenoviruses, Sendai viruses, retroviruses, transposons, plasmids, microcyclic DNA, recombinant proteins, small molecule compounds, RNAs, and other methods that can produce iPSCs. In 2011, Norikatsu et al. reprogrammed mouse and human cells into inducing pluripotent stem cells using mature double stranded RNA miR-200c combined with the mir-369 and miR-302 families (Miyoshi N, Ishii H, Nagano H, et al. Reprogramming of mouse and human cells to pluripotent using nature microRNAs [J]. Cell Stem Cell, 2011, 8 (6): 633-638). Hou et al. screened 10000 small molecule compounds and used a combination of seven small molecule compounds, VC6TFZ, VPA, E616452, CHIR, D4476 FSK, and 2-Me-5HT, to achieve an efficiency of 0.2% in reprogramming from mouse somatic cells to pluripotent stem cells (Hou P, Li Y, Zhang X, et al. Pluripotent stem cells induced from mouse somatic cells by small molecule compounds [J]. Science, 2013, 341 (6146): 651-654).

At present, there are various induction methods for iPSC, but there are the following technical shortcomings: (1) Autologous/allogeneic cell therapy based on iPSC requires stable, reproducible, gene editing free induction methods, and animal derived culture medium components. However, the commonly used induction methods for iPSC are mainly based on gene integration and animal derived culture medium; (2) the application of cell banks, disease modeling, and cell therapy has put forward increasingly high requirements for hiPSC technology, including safety requirements. Currently, commonly used iPSC induction methods usually use a large number of reprogramming factors, including OCT4 (POU5F1), SOX2, L-MYC/1-MYC, KLF4, LIN28, NANOG, SV40LT. The use of a large number of reprogramming factors leads to poor safety of the reprogrammed iPSC; (3) the commonly used iPSC induction methods currently use physical means to obtain a single clone during the isolation stage. This method cannot guarantee that the obtained clone is a single cell clone, and may also introduce undifferentiated cells, which is complex and inefficient.

SUMMARY

In order to solve the aforementioned problems currently faced in this field, the present invention provides an efficient and non-genetically modified iPSC induction, industrial monoclonal selection platform, which can efficiently reprogram and only require the use of the minimum number of reprogramming factors (OCT4, SOX2, E6, E7). In addition, during the separation of monoclonal clones, the present invention uses SSEA4, TRA-1-60 as screening markers and uses flow cytometry sorting technology, sorting individual cells with positive characterization onto a 96 well plate can easily obtain a large number of single cell clones with minimal manual operation, which can be used for industrial production.

The above purpose of the present invention is achieved through the following technical solutions:

The first aspect of the present invention provides a reprogramming factor combination for reprogramming somatic cells into inducing pluripotent stem cells.

Furthermore, the reprogramming factor combination is selected from OCT4, SOX2, E6, E7, KLF4, L-MYC, LIN28, NANOG, and SV40LT.

Preferably, the reprogramming factor combination is OCT4, SOX2, E6, E7.

More preferably, the form of the reprogramming factor combination includes DNA, RNA, and protein.

Most preferably, the DNA is cDNA and the RNA is mRNA.

The terms "induced pluripotent stem cells", "induced pluripotent stem cells", "iPSCs", and "iPSCs" used in the application are interchangeable and refer to a type of pluripotent stem cell that has the ability to self-renew and differentiate into three embryonic layers by artificially reprogramming non pluripotent cells (such as somatic cells). Reprogramming refers to a process of obtaining inducing pluripotent stem cells through exogenous genes expression, compound induction, epigenetic modification and other pathways The second aspect of the present invention provides a reprogramming factor carrier for reprogramming somatic cells into inducing pluripotent stem cells.

Furthermore, the reprogramming factor carrier comprises a reprogramming factor carrier obtained by encoding the reprogramming factor described in the first aspect of the present invention in one and/or more skeleton carriers.

Preferably, the skeleton carrier includes pEGFP N1, pCMVp-NEO-BAN, PEGFP, PEGFT actin, pSV2, and CMV4.

More preferably, the skeleton carrier is pEGFP N1.

Preferably, the reprogramming factor carrier includes one and/or more of the following reprogramming factor carriers: carriers encoding OCT4, carriers encoding SOX2, carriers encoding E6, carriers encoding E7, carriers encoding OCT4 and SOX2, carriers encoding OCT4 and E6, carriers encoding OCT4 and E7, carriers encoding SOX2 and E6, carriers encoding SOX2 and E7, carriers encoding E6 and E7, carriers encoding OCT4 and SOX2 and E6 Carriers encoding OCT4 and SOX2 and E7, carriers encoding OCT4 and E6 and E7, carriers encoding SOX2 and E6 and E7, carriers encoding OCT4 and SOX2 and E6 and E7.

More preferably, the reprogramming factor carrier includes two types of reprogramming factor carriers: carriers encoding OCT4 and SOX2, and carriers encoding E6 and E7.

Most preferably, OCT4 and SOX2 in the carrier encoding OCT4 and SOX2 are connected through a spacer sequence and/or directly connected.

Most preferably, OCT4 and SOX2 in the carrier encoding OCT4 and SOX2 are connected through a spacer sequence.

Most preferably, the spacer sequence includes IRES and/or self cleaving peptide 2A.

Most preferably, the self cleaving peptide 2A is selected from T2A, P2A, E2A, F2A.

Most preferably, the spacer sequence is IRES.

Most preferably, the connection method of OCT4 and SOX2 in the carrier encoding OCT4 and SOX2 includes: OCT4, IRES, SOX2 sequentially connected in series, SOX2, IRES, OCT4 sequentially connected in series.

Most preferably, the connection mode of OCT4 and SOX2 in the carrier encoding OCT4 and SOX2 is that OCT4, IRES, and SOX2 are sequentially connected in series.

Most preferably, E6 and E7 in the carriers encoding E6 and E7 are connected through spacer sequence and/or directly connected.

Most preferably, E6 and E7 in the carriers encoding E6 and E7 are connected through spacer sequences.

Most preferably, the spacer sequence includes IRES, the self cleaving peptide 2A, and/or any two nucleotides.

Most preferably, the self cleaving peptide 2A is selected from T2A, P2A, E2A, F2A.

Most preferably, any two nucleotides are selected from AA, TT, CC, GG, AT, TA, AC, CA, AG, GA, TC, CT, TG, GT, CG, GC.

Most preferably, the interval sequence is IRES;

Most preferably, the connection method of E6 and E7 in the carrier encoding E6 and E7 includes: E6, IRES, E7 sequentially connected in series, E7, IRES, E6 sequentially connected in series.

Most preferably, the connection mode of E6 and E7 in the carrier encoding E6 and E7 is sequential series connection of E6, IRES, and E7.

Most preferably, the nucleotide sequences of the carriers encoding OCT4 and SOX2 are shown in SEQ ID NO: 1.

Most preferably, the nucleotide sequences of the carriers encoding E6 and E7 are shown in SEQ ID NO: 2.

The term "IRES" used in the application refers to the internal ribosome entry site, which is a cis acting RNA sequence that can mediate the internal entry of 40S ribosomal subunits on certain eukaryotic cells and viral messenger RNA upstream of the translation start codon. The presence of IRES ensures the co expression of multiple genes under the control of the same promoter.

The third aspect of the present invention provides a preparation method for inducing pluripotent stem cells derived from somatic cells.

Furthermore, the method comprises the following steps: delivering the reprogramming factor combination described in the first aspect of the present invention to somatic cells.

Preferably, the delivery of the reprogramming factor combination is achieved by introducing the reprogramming factor carrier into somatic cells.

More preferably, the methods of introduction include electro transfection, microinjection, gene gun, DEAE glucan, calcium phosphate co precipitation transfection, and artificial liposome methods.

Most preferably, the method of introduction is an electro transfection method.

Most preferably, the reprogramming factor carrier is the reprogramming factor carrier described in the second aspect of the present invention.

Most preferably, the dosage of the reprogramming factor carrier is: to 80 to 2000,000 somatic cells/100 µL, added 0.5-8 µg carriers encoding OCT4 and SOX2 and carriers encoding E6 and E7.

Preferably, culture somatic cells obtained by introducing reprogramming factor carriers.

More preferably, somatic cells obtained by introducing reprogramming factor carriers are cultured in a cell culture plate.

Most preferably, the cell culture plate is a culture plate coated with extracellular matrix proteins.

Most preferably, the extracellular matrix protein includes laminin.

Most preferably, the laminin is human laminin 521.

Most preferably, the cell culture plate also includes hematopoietic stem cells.

More preferably, on the third day of cultivation, half of the medium is changed, and the E8 medium is used to continue cultivation for 2-4 days for full medium change. The E8 medium is used to continue cultivation until a large number of clones are formed.

Most preferably, the obtained clones are screened, labeled, and sorted to obtain somatic derived induced pluripotent stem cells.

Most preferably, the screening markers include SSEA4, TRA-1-60, SSEA1, TRA-1-81, SSEA3, OCT4, SOX2, and NANOG.

Most preferably, the screening markers are selected from SSEA4, TRA-1-60, SSEA1, TRA-1-81.

Most preferably, the screening markers are SSEA4, TRA-1-60.

Most preferably, the sorting is carried out using flow cytometry sorting technology.

Preferably, the somatic cells include peripheral mononuclear blood cells, fibroblasts, umbilical cord blood cells, fibroblast like synovial cells, myocardial cells, liver cells, neural cells, hematopoietic stem cells, pancreatic islet cells, gastric epithelial cells, B lymphocytes, T lymphocytes, adipocytes, and pancreas β Cells, keratinocytes, mesenchymal stromal cells, epithelial cells, endothelial cells.

More preferably, the somatic cells are peripheral monocytes.

Furthermore, prior to the sorting process, it also includes treating cells with ROCK signaling pathway inhibitors and digesting cells.

Preferably, the processing time is 2 hours.

Preferably, the ROCK signaling pathway inhibitors include Thiazovivin, Belumosudil mesylate, SAR407899, BDP5290, Belumosudil (SLx-2119), ZINC00881524, HA 1100 hydrochloride, Ripaudil (K-115) dihydrorate, SR 3677, GSK180736A, Hydroxyfasudil hydrochloride, GSK26962A, Y-39983 dihydrochloride, Fasudil, GSK429286A, RKI-1447, Fasudil hydrochloride, Y-27632 hydrochloride.

More preferably, the ROCK signaling pathway inhibitor is Thiazovivin.

Preferably, the digestive fluid used for cell digestion includes TRYPLE, trypsin, chymotrypsin, and intestinal kinase.

More preferably, the digestive solution is TRYPLE.

Furthermore, the method also includes culturing and subculturing SSEA4 and TRA-1-60 single positive or double positive cells obtained from sorting.

Preferably, the culture involves seeding the selected SSEA4 and TRA-1-60 single or double positive cells onto a cell culture plate coated with human laminin-521, and culturing them in a 37° C., 5% CO2 incubator for 7-14 days, with daily full fluid exchange.

More preferably, when the cell convergence is about 70%-80%, cell passage is carried out.

The fourth aspect of the present invention provides an induced pluripotent stem cell or cell population derived from somatic cells.

Furthermore, the induced pluripotent stem cells or cell populations are prepared using the method described in the third aspect of the present invention.

The fifth aspect of the present invention provides a reprogrammed somatic cell.

Furthermore, the reprogrammed somatic cells are cells obtained by introducing the reprogrammed factor carrier described in the second aspect of the present invention into somatic cells.

Preferably, the methods of introduction include electro transfection, microinjection, gene gun, DEAE glucan, calcium phosphate co precipitation transfection, and artificial liposome methods.

More preferably, the method of introduction is an electro transfection method.

Preferably, the somatic cells include peripheral mononuclear blood cells, fibroblasts, umbilical cord blood cells, fibroblast like synovial cells, myocardial cells, liver cells, neural cells, hematopoietic stem cells, pancreatic islet cells, gastric epithelial cells, B lymphocytes, T lymphocytes, adipocytes, and pancreas β Cells, keratinocytes, mesenchymal stromal cells, epithelial cells, endothelial cells.

Furthermore, the "reprogrammed somatic cells" are reprogrammed intermediate state cells, which are in an incomplete reprogrammed cell state and are an intermediate state during the reprogramming process, including activation of some pluripotent genes that can be induced to become pluripotent stem cells under suitable culture conditions.

The sixth aspect of the present invention provides a culture medium for reprogramming somatic cells into inducing pluripotent stem cells.

Furthermore, the culture medium is supplemented with selected OCT4 protein, SOX2 protein, E6 protein, E7 protein, KLF4 protein, L-MYC protein, LIN28 protein, NANOG protein, and SV40LT protein.

Preferably, the culture medium is supplemented with OCT4 protein, SOX2 protein, E6 protein, and E7 protein.

The seventh aspect of the present invention provides a kit for producing induced pluripotent stem cells.

Furthermore, the kit comprises a reprogramming factor combination as described in the first aspect of the present invention, a reprogramming factor carrier as described in the second aspect of the present invention, and/or reprogrammed somatic cells as described in the fifth aspect of the present invention.

The eighth aspect of the present invention provides a pharmaceutical composition.

Furthermore, the pharmaceutical composition comprises induced pluripotent stem cells or cell populations as described in the fourth aspect of the present invention;

Preferably, the pharmaceutical composition also includes pharmaceutically acceptable carriers.

The ninth aspect of the present invention provides a method for inducing pluripotent stem cell monoclonal selection from somatic cells.

Furthermore, the method comprises the following steps:
(1) Selecting cells with logarithmic growth phase and digest them;
(2) using screening markers to label the cells obtained in step (1);
(3) sorting the labeled cells obtained in step (2) using flow cytometry sorting technology;
(4) sorting the cells obtained in step (3) into a cell culture plate and culturing them in a 37° C., 5% CO2 incubator to complete the selection of cell clones.

Preferably, step (1) further includes treating cells with ROCK signaling pathway inhibitors before digesting the cells.

More preferably, the processing time is 2 hours.

More preferably, the ROCK signaling pathway inhibitors include Thiazovivin, Belumosudil mesylate, SAR407899, BDP5290, Belumosudil (SLx-2119), ZINC00881524, HA 1100 hydrochloride, Ripsudil (K-115) dihydrorate, SR 3677, GSK180736A, Hydroxyfasudil hydrochloride, GSK26962A, Y-39983 dihydrochloride, Fasudil, GSK429286A, RKI-1447, Fasudil hydrochloride, Y-27632 hydrochloride.

Most preferably, the ROCK signaling pathway inhibitor is Thiazovivin.

Preferably, the digestive fluid used for the digestive cells in step (1) includes TRYPLE, trypsin, chymotrypsin, and intestinal kinase.

More preferably, the digestive solution used for the digestive cells in step (1) is TRYPLE.

Preferably, the screening markers described in step (2) include SSEA4, TRA-1-60, SSEA1, TRA-1-81, SSEA3, OCT4, SOX2, and NANOG.

More preferably, the screening markers described in step (2) are selected from SSEA4, TRA-1-60, SSEA1, and TRA-1-81.

Most preferably, the screening markers described in step (2) are SSEA4 and TRA-1-60.

Preferably, the cell culture plate described in step (4) is a cell culture plate coated with extracellular matrix proteins.

More preferably, the extracellular matrix protein includes laminin.

Most preferably, the laminin is human laminin 521.

Furthermore, the method also includes expanding the culture of cell clones.

The tenth aspect of the present invention provides applications in any of the following aspects:

(1) The application of E6 and E7 in the preparation of induced pluripotent stem cells derived from somatic cells;
(2) the application of the reprogramming factor combination described in the first aspect of the present invention in the preparation of induced pluripotent stem cells derived from somatic cells;
(3) the application of the reprogramming factor carrier described in the second aspect of the present invention in the preparation of induced pluripotent stem cells derived from somatic cells;
(4) the application of induced pluripotent stem cells or cell populations as described in the fourth aspect of the present invention, and reprogrammed somatic cells as described in the fifth aspect of the present invention in producing precursor cells for differentiated cells and/or differentiated cells;
(5) the application of induced pluripotent stem cells or cell populations as described in the fourth aspect of the present invention, and reprogrammed somatic cells as described in the fifth aspect of the present invention in constructing disease models;
(6) the application of induced pluripotent stem cells or cell populations as described in the fourth aspect of the present invention, and reprogrammed somatic cells as described in the fifth aspect of the present invention in constructing a tumor stem cell model;
(7) the application of induced pluripotent stem cells or cell populations as described in the fourth aspect of the present invention, and reprogrammed somatic cells as described in the fifth aspect of the present invention in the preparation of drugs for treating diseases;
(8) the application of induced pluripotent stem cells or cell populations as described in the fourth aspect of the present invention, and reprogrammed somatic cells as described in the fifth aspect of the present invention in screening candidate drugs for treating diseases;
(9) the application of induced pluripotent stem cells or cell populations as described in the fourth aspect of the present invention, and reprogrammed somatic cells as described in the fifth aspect of the present invention in drug evaluation for disease treatment;
(10) the application of the induced pluripotent stem cells or cell populations described in the fourth aspect of the present invention, and the reprogrammed somatic cells described in the fifth aspect of the present invention in cell therapy of diseases;
(11) The induced pluripotent stem cells or cell populations described in the fourth aspect of the present invention, and the application of reprogrammed somatic cells described in the fifth aspect of the present invention in cell transplantation and tissue repair;
(12) the application of the induced pluripotent stem cells or cell populations described in the fourth aspect of the present invention, and the reprogrammed somatic cells described in the fifth aspect of the present invention in organ regeneration;
(13) the application of induced pluripotent stem cells or cell populations as described in the fourth aspect of the present invention, and reprogrammed somatic cells as described in the fifth aspect of the present invention in the preparation of targeted in vivo tumor lesion formulations;
(14) the application of induced pluripotent stem cells or cell populations as described in the fourth aspect of the present invention, and reprogrammed somatic cells as described in the fifth aspect of the present invention in immune cell anti-tumor therapy;
(15) the application of the culture medium described in the sixth aspect of the present invention in the preparation of induced pluripotent stem cells derived from somatic cells;
(16) the application of the kit described in the seventh aspect of the present invention in the production of induced pluripotent stem cells;
(17) the application of the pharmaceutical composition described in the eighth aspect of the present invention in the prevention and/or treatment of diseases.

Preferably, the diseases include Alzheimer's disease, Parkinson's disease, amyotrophic lateral sclerosis, spinal muscular atrophy, Down's syndrome, X chromosome vulnerability syndrome, Reiter syndrome, Huntington's disease, familial autonomic nervous dysfunction disease, schizophrenia, ataxia, diabetes, cardiovascular disease, age-related macular degeneration, myopic macular degeneration, Steger's disease, kidney disease Liver disease, lung disease, hemophilia, myeloma.

Preferably, the tumor includes melanoma, prostate cancer, breast cancer, lung cancer, kidney cancer, liver cancer, cervical cancer, vulva cancer, B-cell lymphoma, T-cell lymphoma, myeloma, leukemia, hematopoietic system tumor, thymoma, lymphoma, sarcoma, non-Hodgkin's lymphoma, Hodgkin's lymphoma, skin cancer, uterine cancer, endometrial cancer, adenocarcinoma, pancreatic cancer, colorectal cancer, anal cancer, bladder cancer, ovarian cancer Squamous cell carcinoma, basal cell carcinoma, brain cancer, angiosarcoma, vascular endothelial tumor, head and neck cancer, thyroid cancer, soft tissue sarcoma, osteosarcoma, testicular cancer, gastrointestinal cancer.

Furthermore, the term 'precursor cells' refers to all intermediate cells involved in the process of inducing pluripotent stem cells or cell populations, reprogrammed somatic cells to differentiate into differentiated cells. The intermediate cells include all cells involved in the process, except for the initial cells (inducing pluripotent stem cells or cell populations, reprogrammed somatic cells) and terminal cells (differentiated cells).

The advantages and beneficial effects of the present invention:

Compared to existing technologies, the efficient and non-genetically modified iPSC induction and industrialized monoclonal selection platform provided by the present invention reduces potential carcinogenicity by using the minimum number of reprogramming factors, while achieving high induction efficiency and improving the operability of reprogramming technology. In addition, during the separation of monoclonal clones, the present invention uses SSEA4/TRA-1-60 as screening markers and uses flow cytometry sorting technology, sorting individual cells with positive characterization onto a 96 well plate can easily obtain a large number of single cell clones with minimal manual operation, which can be used for industrial production.

BRIEF DESCRIPTION OF DRAWINGS

The following is a detailed description of the embodiments of the present invention in conjunction with the accompanying drawings, wherein.

DETAILED DESCRIPTION

The following will further elaborate on the present invention in conjunction with specific embodiments, which is only intended to explain the present invention and cannot be understood as a limitation of the present invention. Ordinary skilled person in this field can understand that various changes, modifications, substitutions, and variations can be made to these embodiments without departing from the principles and purposes of the present invention. The scope of the present invention is limited by the claims and their equivalents. The experimental methods in the following embodiments that do not specify specific conditions are usually tested under conventional conditions or according to the conditions recommended by the manufacturer.

Example 1: Construction of Reprogrammed Plasmid

1. Experimental Materials

The pEGFP N1 plasmid described in this embodiment was purchased from Addgene Company.

2. Experimental Methods (1) Using the pEGFP N1 plasmid as the skeleton carrier and EcoR1 and Not1 as the cleavage sites;
(2) Gene synthesis of OCT4-IRES-SOX2 and E6-E7 was carried out by Anhui General Biotechnology Co., Ltd., OCT4-IRES-SOX2 and E6-E7 were inserted between EcoR1 and Not1 of the pEGFP N1 plasmid, and the carriers were named OCT4-IRES-SOX2 and E6-E7;
(3) the sequence of OCT4-IRES-SOX2 is shown in SEQ ID NO:1. OCT4 and SOX2 are sequentially connected through spacer sequences, with the spacer sequence being IRES. The IRES sequence can be replaced with self-cleaving 2A peptide (self-cleaving 2A peptide, 2A), including E2A, P2A, T2A, F2A, etc.
(4) the sequence of E6-E7 is shown in SEQ ID NO:2. E6 and E7 are sequentially connected by a spacer sequence called IRES. The IRES sequence can be replaced by a self-cleaving 2A peptide (self-cleaving 2A peptide, 2A), including E2A, P2A, T2A, F2A, etc. The IRES sequence can also be replaced by any two nucleotides, such as AA, TT, CC, GG, AT, TA, AC, CA, AG, GA, TC, CT, TG, GT, CG, GC.

Example 2 PBMC Amplification Preparation Operation

1. Experimental Materials

Peripheral blood mononuclear cells (PBMCs) were purchased from STEMCELL Technologies under item #70072.2; StemSpan™ SFEM II is purchased from STEMCELL Technologies under item #09655; StemSpan™ The CD34+Expansion Supplement was purchased from STEMCELL Technologies under item #02691.

2. Experimental Methods (1) Took out a 12 to 15 million PBMC that has been frozen from the liquid nitrogen tank, placed it in a hot water bath with a temperature of 37 to 40° C., gently shaked it, and when there were only small crystals left in the frozen tube, thoroughly disinfect the surface of the frozen tube with 75% alcohol, wiped off 75% alcohol with sterile gauze, and placed it on an ultra clean workbench;

(2) added the cell suspension to a basic culture medium containing 10 mL of preheated hematopoietic stem cells using a pipette, gently mixed well, and then took samples for counting. At the same time, balance and centrifuge with 200 g for 10 minutes;

Among them, the hematopoietic stem cell basic culture medium group was composed by StemSpan™ SFEM II and StemSpan™ CD34+Expansion Supplement, configured according to the manufacturer's requirements;

(3) After centrifugation, gently aspirate the supernatant with a pipette and resuspend the cells with 2 mL of hematopoietic stem cell expansion medium (preheated to 37° C.). Mix well and inoculated 1 mL of cell suspension per well onto a 12 well plate. Inoculated a total of 2 wells and culture them in a 37° C., 5% CO2 cell incubator;

(4) After 3 to 6 days of cultivation until cell proliferation, large colonies can be formed, with a large number of colonies, most commonly found in areas with high cell density, and then subjected to electro transfection.

Example 3 PBMC Electro Transfection Operation

1. Experimental Materials

The reprogramming plasmids OCT4-IRES-SOX2 and E6-E7 constructed in Example 1 of the present invention, and the PBMC obtained from cultivation and amplification in Example 2 of the present invention.

2. Experimental Methods (1) Gently blow the cells to be electro transfected (PBMC) and collected the cell suspension into a new 50 mL centrifuge tube;
(2) washed the cell pores once with 2 mL DPBS, transferred the cleaning solution to the aforementioned 50 mL centrifuge tube, gently mixed well, and then took a sample for counting;
(3) after balancing, centrifuged at 200 g for 10 minutes, centrifuged and count;
(4) according to the counting results, the number of inoculated cells on the 6-well plate was 80 to 2 million cells per well;
(5) after centrifugation, the cells were resuspended according to the cell count, resulting in a cell concentration of $0.8 \times 10^6$-$2.0 \times 10^6$ cells/100 µL. After resuspension, take 300 µL cell suspension, i.e. 6 million cells, undergoes three electro transfection reactions;
(6) According to each electro transfection reaction (80 to 2 million cells/100 µL), added 0.5-8 µg plasmids (OCT4-IRES-SOX2 and E6-E7).

Example 4 PBMC Reprogramming Operation

1. Experimental Materials

The PBMC obtained after electric transfection in Example 2 of the present invention; recombinant human laminin-521 was purchased from Thermo Fisher Scientific Co., Ltd., product number A29249; the E8 culture medium was purchased from Thermo Fisher Scientific Co., Ltd. with product number A1517001; TRYPLE was purchased from Thermo Fisher Scientific Co., Ltd. with product number 12604013; Alexa Fluor® 488 anti-human SSEA-4 Antibody is purchased from BioLegend Company with product number 330412; Alexa Fluor® The 594 anti-human TRA-1-60-R Antibody was purchased from Biogene Corporation under product number 330616.

2. Experimental Methods (1) Transferred the electro transfected PBMC to a 6 cm well plate/culture dish coated with recombinant human laminin-521, added 2 mL of hematopoietic stem cells for expansion and culture, and placed them in a 37° C., 5% CO2 cell incubator for cultivation;
(2) On the first day of observation and photography: at this point, some adherent cells can be seen;
(3) On the third day and a half, changed the medium and continued cultivation using E8 medium;
(4) On days 5-7, observed the number and morphological changes of adherent cells: the cell morphology will gradually change from a polar neuroid like cell to a short rod-shaped one, and then to an epithelioid one. The nuclear region and nucleoli will gradually become apparent, and deformed cells can be observed to form small cell colonies; performed a complete fluid exchange on the cells, used E8 medium, and continued cultivation;
(5) On the 7th to 21st days, the cells were completely changed daily using E8 culture medium; generated a large number of clones when the clone size is 100 µm-1 mm and when the number of cells is approximately 100-10000, used 0-20 µM ROCK signaling pathway inhibitor Thiazovivin to treat cells for 2 hours, and the clones were digested into single cells using TRYPLE;
(6) Collected cells into a 12 mL centrifuge tube, centrifuged, removed supernatant, and cleaned cells twice with DPBS;
(7) Follow the supplier's instructions, used Alexa Fluid® 488 anti-human SSEA-4 Antibody and Alexa Fluor® 594 anti-human TRA-1-60-R Antibody to label cells;
(8) The labeled cells were sorted on the flow cytometry platform. SSEA-4 and TRA-1-60 single or double positive cells were seeded on a 96 cm well plate coated with human laminin-521, and cultured in a 5% CO2 cell incubator at 37° C.;
(9) Continued to culture in a 96 well plate for 7-14 days, and performed a full fluid exchange operation every day. When the cell convergence rate is about 70%-80%, the cells are subcultured into a 48 well plate;
(10) Continued to cultivate cells, and when the cell convergence rate is about 70%-80%, proceed with passage operations. The passage vessel requirements are: P0 (24 well plate)→P1 (12 well plate)→P2 (T25 bottle)→P3 (T25 bottle)→P4 (T25/T75 bottle), etc.

3. Experimental Results

Figure 1:
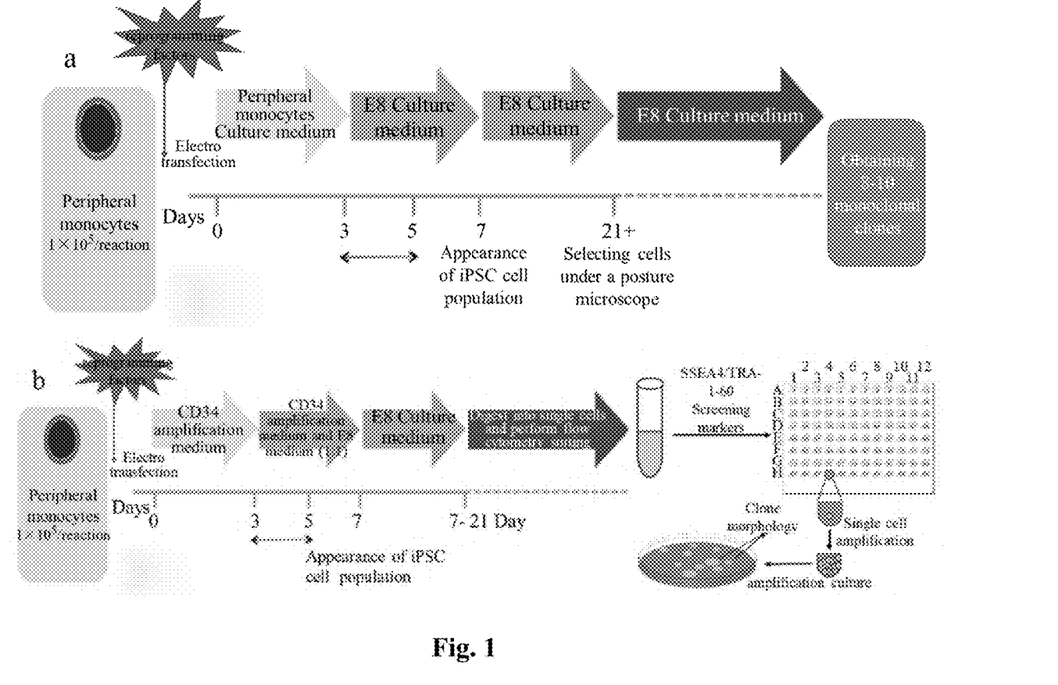
FIG. 1 is the flowchart of an efficient and non-genetically modified iPSC induction and industrial monoclonal selection platform developed by the present invention, as well as the flowchart of the current iPSC induction method, in which a of FIG. 1 shows the flowchart of the current iPSC induction method, and b of FIG. 1 shows the flowchart of the efficient and non-genetically modified iPSC induction and industrial monoclonal selection platform developed by the present invention.
Figure 2:
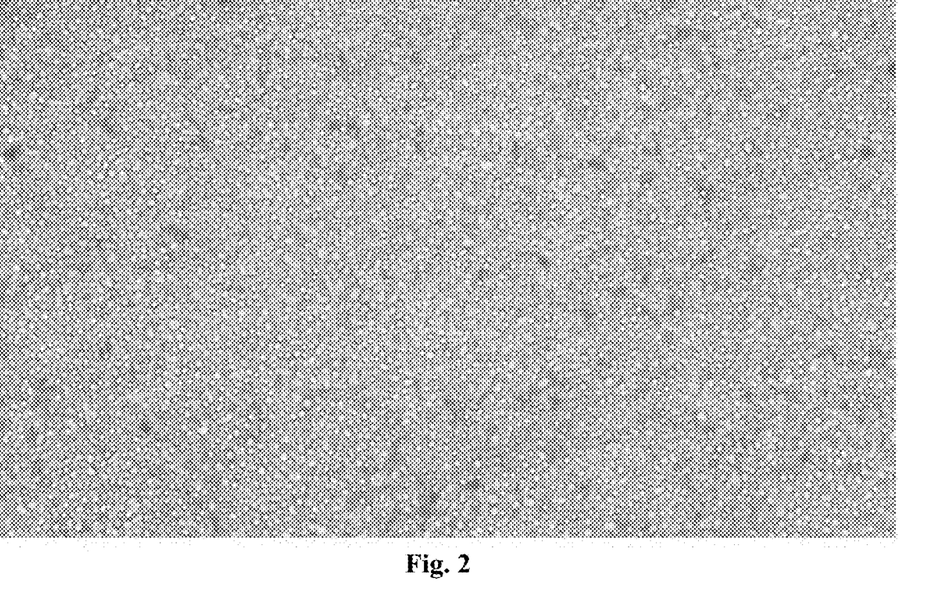
FIG. 2 shows the morphology of iPSC reprogramming using OCT4-IRES-SOX2 and E6-E7 plasmids after PBMC electro transfection on the first day.
Figure 3:
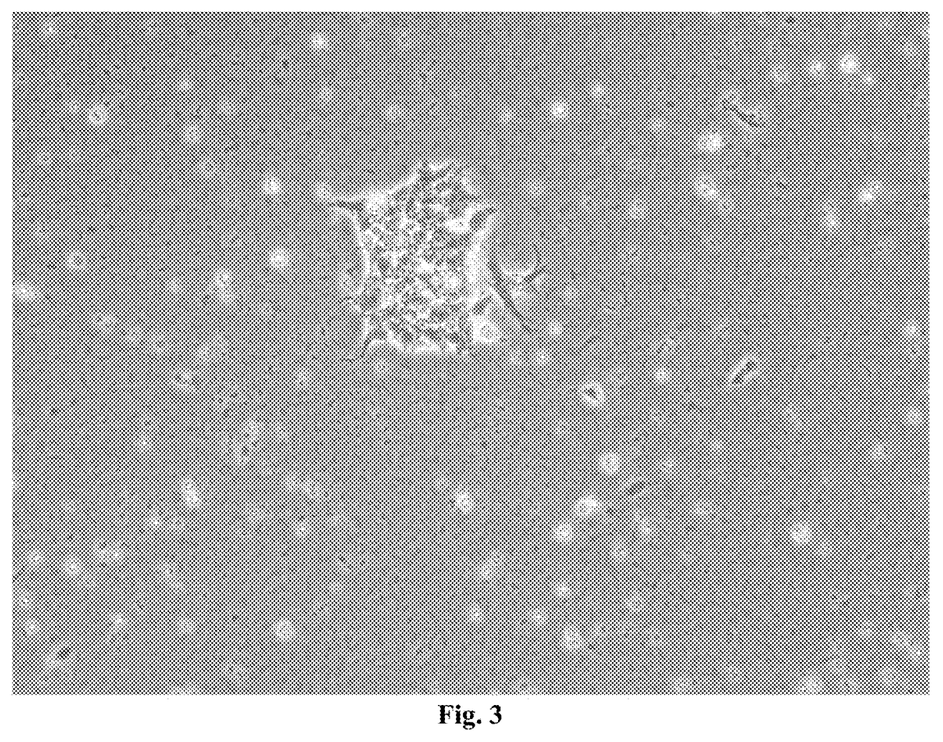
FIG. 3 shows the morphology of epithelial cells produced on the 7th day after iPSC reprogramming using OCT4-IRES-SOX2 and E6-E7 plasmids.
Figure 4:
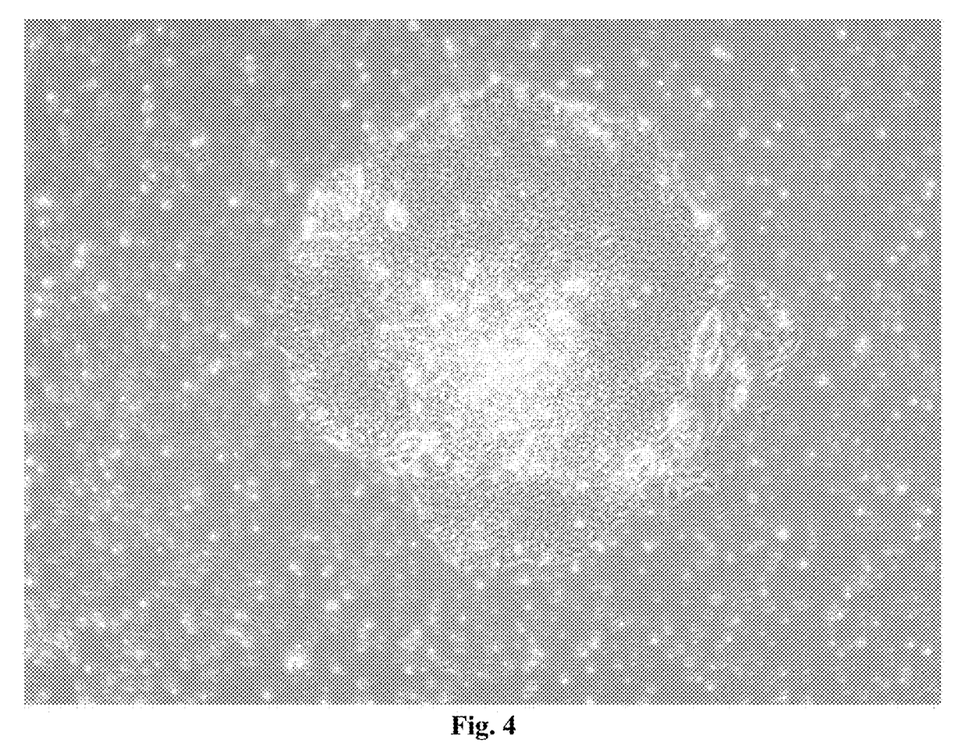
FIG. 4 shows the morphology of epithelial cells produced on day 20 after iPSC reprogramming using OCT4-IRES-SOX2 and E6-E7 plasmids.

The flowchart of the efficient and genetically modified iPSC induction and industrial monoclonal selection platform developed by the present invention is shown in b of FIG. 1, and the current iPSC induction method flowchart is shown in a of FIG. 1;

The experimental results showed that iPSC reprogramming using OCT4-IRES-SOX2 and E6-E7 plasmids resulted in normal cell morphology, fewer cell colonies, clean background, and fewer dead cells after PBMC electroporation on the first day (see FIG. 2); IPSC reprogramming was performed using OCT4-IRES-SOX2 and E6-E7 plasmids, and on the 7th day, epithelioid cells were produced without fully exhibiting clonal growth (see FIG. 3); Using OCT4-IRES- SOX2 and E6-E7 plasmids for iPSC reprogramming, on the 20th day, epithelioid cells were produced and showed clonal growth (see FIG. 4).

Example 5 iPSC Dry Identification

1. Experimental Methods (1) Take approximately $3 \times 10^4$ iPS cells for test sample, $1 \times 10^4$ cells per hole were seeded onto a 24 well cell culture plate coated with Matrigel, totally 3 wells. 1 mL of freshly prepared E8 complete culture medium containing ROCK was added to each well and incubated at 37° C. in a 5% CO2 cell culture incubator for 24 hours;
(2) On the second day, performed a fluid change operation, discarded the old culture medium, added 1 mL of E8 complete culture medium to each well, and cultured in a 37° C., 5% CO2 cell incubator until the convergence reaches about 50%, and prepared for staining when no colonies are formed;
(3) Prepared alkaline phosphatase staining solution (AP staining solution), and the composition and content of the alkaline phosphatase staining solution are shown in Table 1;
(4) Absorbed and discarded the cell culture medium to be tested in a 24 well plate, and cleaned it twice with DPBS for 1 minute each time;
(5) Then added 200 μL 4% paraformaldehyde to each hole and blocked it in a dark place for 20 minutes;
(6) Absorbed and discarded the blocked solution, then cleaned twice with DPBS, each time for 1 minute;
(7) Then added 200 μL AP staining solution to each hole, dark staining for 1 hour;
(8) After staining, rinsed 1-2 times with sterile water to remove floating colors. Added sterile water to the hole, observed under an inverted microscope, and take photos for archiving.

TABLE 1

Composition and Content of Alkaline Phosphatase Staining Solution (AP Staining Solution)

| Alkaline phosphatase staining solution (AP staining solution) | Alkaline phosphatase chromogenic buffer | 3 mL | 3.03 mL |
|---|---|---|---|
| | BCIP solution (300X) | 10 μL | |
| | NBT solution (150X) | 20 μL | |

2. Experimental Results

Figure 5:
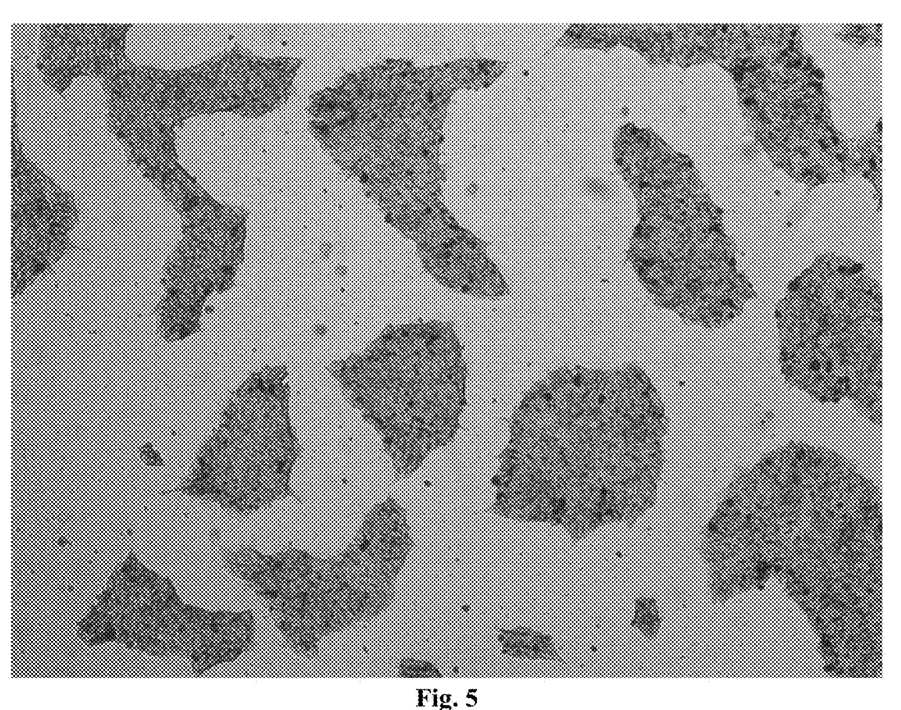
FIG. 5 shows the results of OSE6-IPSC alkaline phosphatase staining using OCT4-IRES-SOX2 and E6-E7 plasmids.

The experimental results showed that iPSCs were positively expressed by alkaline phosphatase staining (see FIG. 5), indicating high alkaline phosphatase activity in iPSCs and iPSCs is in their undifferentiated state.

Example 6 Immunofluorescence Identification

1. Experimental Materials

The information of the primary and secondary antibodies used in this example is as follows: Anti Nanog antibody (Abcam company, product number: ab109250); Mouse anti SSEA-4 (Abcam Company, product number ab16287); Mouse anti TRA-1-60 (Abcam company, product number: ab16288); Anti Oct4 antibody (Abcam company, product number: ab19857); Recombinant Anti SOX2 antibody [EPR3131] (Abcam Company, ab92494); Goat anti Mouse IgG3 Cross Adsorbed Secondary Antibody, Alexa Fluor 488 (Invitrogen, A-21151); Goat anti Mouse IgM (Heavy chain) Cross Adsorbed Secondary Antibody, Alexa Fluor 488 (Invitrogen, A-21042); Donkey anti rabbit IgG (H+L) Highly Cross Adsorbed Secondary Antibody, Alexa Fluor 594 (Invitrogen, A-21207); Donkey anti rabbit IgG (H+L) Highly Cross Adsorbed Secondary Antibody, Alexa Fluor 488 (Invitrogen, A-21206).

2. Experimental Methods (1) Soaked the slides of cells that have already crawled on a 24 well culture plate with PBS three times, each time for 3 minutes;
(2) blocked the slide at room temperature with 4% paraformaldehyde for 15 minutes, and soaked the slide with PBS three times for 3 minutes each time;
(3) 0.5% Triton X-100 (prepared with 5% BSA) is permeability at room temperature for 20 minutes (this step is omitted for antigens expressed on the cell membrane);
(4) blocked at room temperature with 5% BSA for 1 hour;
(5) removed the blocking liquid and added 400 μL primary antibody to each hole, incubated overnight at 4° C.;
the above steps (1)-(5) are for the first day of work;
(6) added fluorescent secondary antibody: soaked PBST 3 times for 5 minutes each time, add diluted fluorescent secondary antibody, incubated at room temperature for 1 hour, and soaked PBST 3 times for 5 minutes each time; started from adding fluorescent secondary antibodies, all subsequent steps should be carried out in a darker area as much as possible;
(7) re stained nucleus: added DAPI dropwise, incubated in dark for 5 minutes, stained the specimen with nucleus, PBST for 5 minutes×4 times to wash off excess DAPI;
(8) added 500 μL PBS, shoot on camera.

3. Experimental Results

Figure 6:
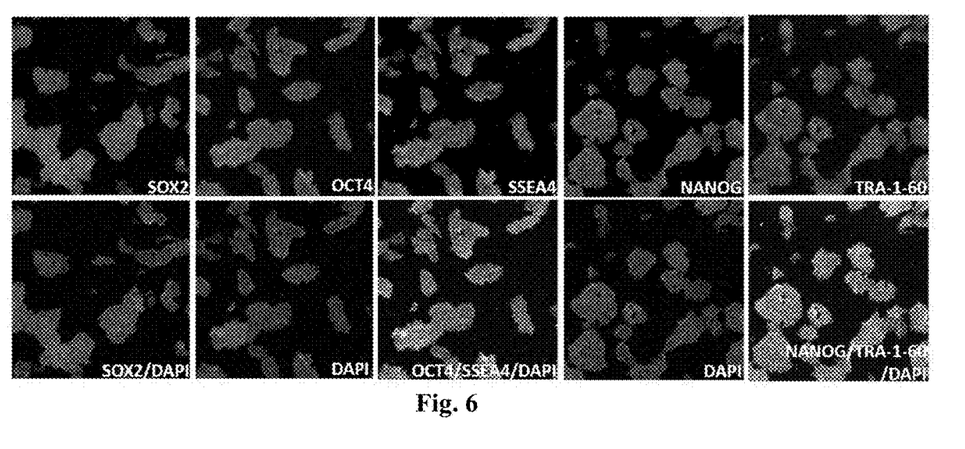
FIG. 6 shows the OSE6-IPSC immunofluorescence results obtained using OCT4-IRES-SOX2 and E6-E7 plasmids.

The results showed that after immunofluorescence staining, OSE6-IPSC obtained using OCT4-IRES-SOX2 and E6-E7 plasmids expressed stem cell surface markers SOX2, OCT4, NANOG, SSEA4, TRA-1-60 (see FIG. 6), indicating the stemness of the iPSC.

Example 7 Flow Detection

1. Experimental Materials

The antibodies used in this example are all purchased from Biogene Company, and the antibodies include: Alexa Fluor® 594 anti Nano Anti body (674204); Alexa Fluor® 594 anti Oct4 (Oct3) Anti body (653708); Alexa Fluor® 488 anti human SSEA-4 Anti body (330412); PE anti mouse/human CD15 (SSEA-1) Anti body (125605); Alexa Fluor® 488 anti human TRA-1-60-R Antibody (330613); Alexa Fluor® 488 anti human TRA-1-81 Anti body (330709); Alexa Fluor® 555 Mouse anti Sox2 (560293).

2. Experimental Methods (1) Centrifuged iPSC cells in a 15 mL centrifuge tube with 200 g for 10 minutes, discarded the supernatant, transfer to 1.5 mL EP tubes, added 1 mL of fixative solution (4% paraformaldehyde), and incubated at room temperature for 10 minutes;

(2) After rapid centrifugation with a micro centrifuge, removed 1.5 mL of EP tube fixative solution and washed 3 times with 0.5 mL of DPBS;

(3) After rapid centrifugation, removed 1.5 mL of DPBS from the EP tube, added 1 mL of 5% BSA blocking solution, and let stand at room temperature for 30 minutes;

(4) Group, package, and label the blocked samples according to the set experiment;

(5) The supernatant of the experimental group was aspirated and discarded, and 0.2 mL of primary antibody working solution was added to the experimental well. The negative control group was left untreated and incubated at room temperature for 1 hour;

(6) Absorbed and discard the supernatant, added 0.2 mL of DPBS to each well and washed three times;

(7) Added 0.2 mL of secondary antibody working solution to each well and incubated at room temperature in dark for 1 hour;

(8) Removed the supernatant and added 0.5 mL of DPBS to each well for washing three times;

(9) Prepared the flow sample for flow cytometry, and saved the document after analysis is completed.

3. Experimental Results

Figure 7:
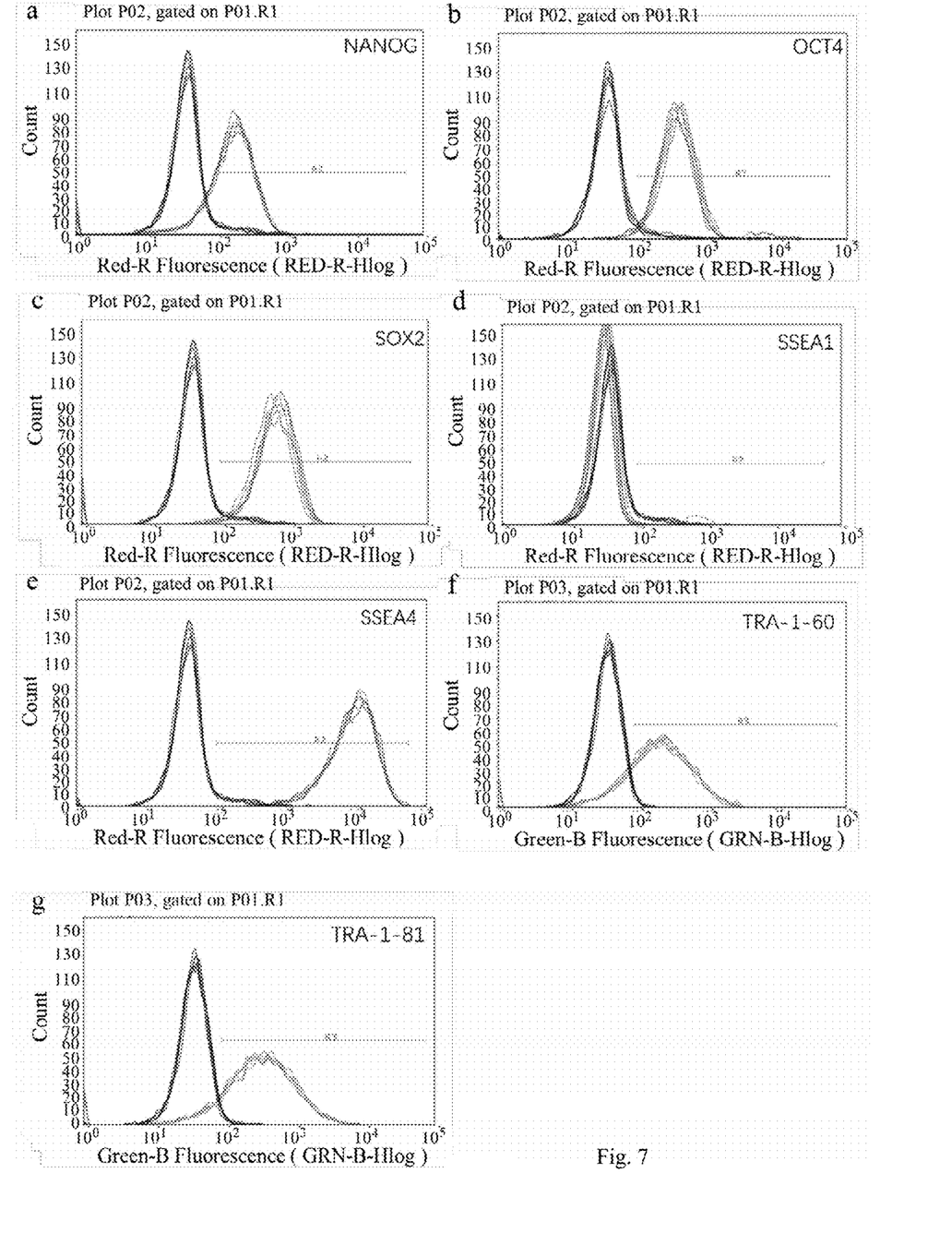
FIG. 7 shows the flow cytometry results of OSE6-IPSC obtained using the OCT4-IRES-SOX2 and E6-E7 plasmids, in which a of FIG. 7 shows NANOG, b of FIG. 7 shows OCT4, c of FIG. 7 shows SOX2, d of FIG. 7 shows SSEA1, e of FIG. 7 shows SSEA4, f of FIG. 7 shows TRA-1-60, and g of FIG. 7 shows TRA-1-81.

The results of OSE6-IPSC flow cytometry using OCT4-IRES-SOX2 and E6-E7 plasmids showed that NANOG, OCT4, SOX2, SSEA4, TRA-1-60, and TRA-1-81 were all positive, while SSEA1 was negative (see a-g of FIG. 7), consistent with the gene expression characteristics of iPSC stem cells, further indicating that the iPSC has stemness.

Example 8 Identification of Teratoma Formation

1. Experimental Methods (1) Prepared iPSC cells $6 \times 10^6$ cells per mouse were subcutaneously injected into the right armpit of the mouse's forelimb, with an injection volume of 0.2 mL/point per mouse. After injection, the mice were observed for 8 weeks, including tumor formation at the transplantation site and the general condition of the mice;

(2) After the animal was euthanized, if there is a tumor, the tumor should be removed, the material should be taken, the tumor should be weighed, and the tumor should be subjected to histopathological examination.

2. Experimental Results

Figure 8:
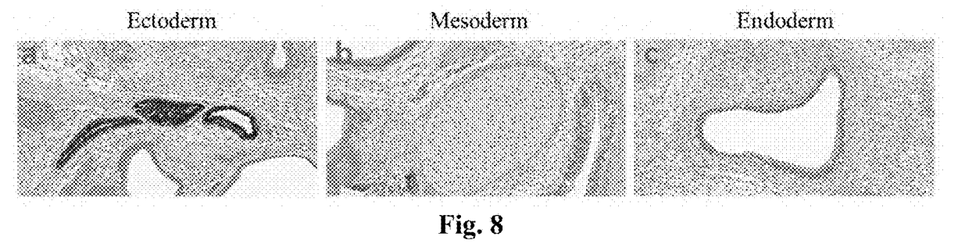
FIG. 8 shows the HE staining results of OSE6-IPSC teratoma slices obtained using OCT4-IRES-SOX2 and E6-E7 plasmids, where a represents the hair follicle structure, b represents the cartilage structure, and c represents the digestive tract epithelial structure.

The HE staining results of OSE6-IPSC teratoma sections obtained using OCT4-IRES-SOX2 and E6-E7 plasmids are shown in a-c of FIG. 8. Among them, a is the hair follicle structure, b is the cartilage structure, and c is the digestive tract epithelial structure, indicating that the obtained iPSC can successfully form teratomas and has pluripotency for in vivo differentiation.

Example 9 Karyotype Detection

1. Experimental Methods (1) Approximately $3 \times 10^5$ iPS cells for the test sample were seeded into T25 cell culture flasks coated with Matrigel, and 1 mL of freshly prepared E8 complete culture medium containing ROCK was added to each well. They were incubated at 37° C. in a 5% CO2 cell culture incubator for 24 hours;

(2) The next day, used E8 complete culture medium to replace the solution and sent it for external testing. The external testing unit was Jinan Aidikang Medical Testing Center.

2. Experimental Results

Figure 9:
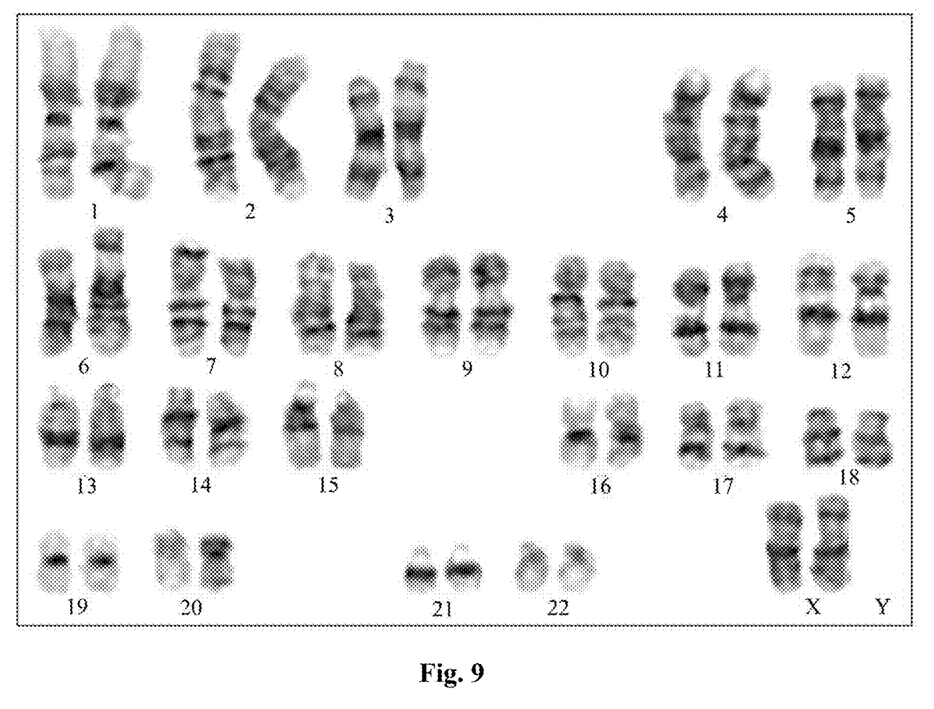
FIG. 9 shows the results of OSE6-IPSC karyotype detection using OCT4-IRES-SOX2 and E6-E7 plasmids.

The karyotype detection results of OSE6-IPSC obtained using the OCT4-IRES-SOX2 and E6-E7 plasmids in this example are shown in FIG. 9. 46 chromosomes with normal numbers and XX sex chromosomes are visible, indicating a female karyotype and no abnormalities in chromosome structure. This indicates that the OSE6-IPSC obtained using the OCT4-IRES-SOX2 and E6-E7 plasmids does not exhibit chromosomal aberrations and all exhibit normal karyotypes.

Comparison of iPSC Reprogramming Efficiency in Example 10

1. Experimental Materials

The commercial reprogramming kit CD34+Progenitor Reprogramming Kit used in this example was purchased from STEMCELL Technologies under item #05925.

2. Experimental Methods (1) Prepared PBMC cells according to the PBMC amplification method;

(2) Used OCT4-IRES-SOX2 plasmid (OS) alone, E6-E7 plasmid (E6/E7) alone, and OCT4-IRES-SOX2 and E6-E7 plasmids (OSE6) according to PBMC reprogramming method;

(3) Used the commercial reprogramming kit CD34+Progenitor Reprogramming Kit to reprogram according to the instructions;

(4) Compared the reprogramming efficiency of the four schemes mentioned above and the resulting number of clones.

2. Experimental Results

The results showed that the reprogramming efficiency using OCT4-IRES-SOX2 alone (OS), E6-E7 alone (E6/E7), OCT4-IRES-SOX2 and E6-E7 alone (OSE6), and commercial reprogramming kits (kit) were 0, 0, 2%-5%, and 0.2%-4.9%, respectively (see Table 2); The number of clones obtained using OCT4-IRES-SOX2 reprogramming (OS) alone, E6-E7 reprogramming (E6/E7) alone, OCT4-IRES-SOX2 and E6-E7 reprogramming (OSE6), and commercial reprogramming kits (kits) were 0, 0, 125±30, and 11±5, respectively (see Table 3), indicating that the reprogramming efficiency using OCT4-IRES-SOX2 and E6-E7 reprogramming (OSE6) is not only better than the currently available commercial reprogramming kits (kits), the final number of monoclonal clones obtained is also much higher than that of commercial reprogramming kits, which can be used for industrial production.

TABLE 2

Reprogramming Efficiency Results Using OS, E6/E7, OSE6, Kit Reprogramming

| | Reprogramming factor combinations | | | |
|---|---|---|---|---|
| | OS | E6/E7 | OSE6 | kit |
| Reprogramming Efficiency | 0 | 0 | 2%-5% | 0.2%-4.9% |

TABLE 3

The final number of clones obtained by reprogramming using OS, E6/E7, OSE6, and kit

| | Reprogramming factor combinations | | | |
|---|---|---|---|---|
| | OS | E6/E7 | OSE6 | kit |
| Reprogramming factor combinations/ 10000 cells | 0 | 0 | 125 ± 30 | 11 ± 5 |

The explanation of the above embodiments is only for understanding the methods and core ideas of the present invention. It should be pointed out that for ordinary technical personnel in this field, without departing from the principles of the present invention, several improvements and modifications can be made to the present invention, which will also fall within the scope of protection of the claims of the present invention.

The invention claimed is:

1. A method for inducing pluripotent stem cells from peripheral blood mononuclear cells comprising:

(i) delivering a reprogramming factor combination comprising OCT4, SOX2, E6, and E7 to peripheral blood mononuclear cells, wherein the delivery of the combination to the peripheral blood mononuclear cells induces pluripotent stem cells;

wherein the reprogramming factors are comprised in carriers comprising two plasmids, wherein a first plasmid comprises nucleic acids sequences encoding OCT4 and SOX2, wherein October 4 and SOX 2 are connected by an IRES spacer and the first plasmid comprises the nucleic acid sequence set forth in SEQ ID NO: 1, and wherein a second plasmid comprises nucleic acid sequences encoding E6 and E7, wherein E6 and E7 are connected by an IRES spacer and the second plasmid comprises the nucleic acid sequence set forth in SEQ ID NO: 2;

wherein the plasmids are delivered at a dosage 0.5 μg to 0.8 μg and the peripheral blood mononuclear cells are at a concentration of 80 to 200,000 peripheral blood mononuclear cells/100 μL; and wherein delivering comprises electroporation, microinjection, DEAE glucan, calcium phosphate co-precipitation transfection, and artificial liposomes;

(ii) culturing the peripheral blood mononuclear cells from step (i) in a cell culture plate containing a medium and an extracellular matrix coating, wherein, on a third day of culturing, half of the medium is changed to an E8 medium to culture the cells for 2-4 days until a full medium change;

wherein the E8 medium is used to continue culturing until the number of induced pluripotent stem cells is approximately 100-10,000 cells; and (iii) labeling the induced pluripotent cells derived from step (ii) for marker expression, wherein the markers comprise SSEA4, TRA-1-60, SSEA1, TRA-1-81, SSEA3, OCT4, SOX2, and NANOG;

wherein the induced pluripotent stem cells are labeled with antibodies, wherein the antibodies comprise anti-Nanog, anti-Oct4, recombinant anti-SOX2, anti-SSEA-1, anti-human TRA-1-81, anti-human SSEA-4 and anti-human TRA-1-60-R antibodies, and (iv) sorting the labeled induced pluripotent stem cells from step (iii) to obtain induced pluripotent stem cells derived from peripheral blood mononuclear cells, wherein the sorting is performed by flow cytometry.

2. The method according to claim 1, wherein the plasmids are delivered by electroporation.

3. The method according to claim 1, wherein the extracellular matrix proteins comprise laminin, and the laminin is human laminin 521.

4. The method according to claim 1, wherein the cell culture plate further comprises hematopoietic stem cells.

5. The method according to claim 1, wherein the induced pluripotent stem cells express markers selected from the group consisting of: SSEA4, TRA-1-60, SSEA1, and TRA-1-81.

6. The method according to claim 5, wherein the induced pluripotent stem cells express SSEA4 and TRA-1-60.

* * * * *

SEQUENCE LISTING

```
Sequence total quantity: 2
SEQ ID NO: 1              moltype = DNA  length = 2715
FEATURE                   Location/Qualifiers
source                    1..2715
                          mol_type = other DNA
                          organism = synthetic construct
SEQUENCE: 1
atggcgggac acctggcttc ggatttcgcc ttctcgcccc ctccaggtgg tggaggtgat    60
gggccagggg ggccggagcc gggctgggtt gatcctcgga cctggctaag cttccaaggc   120
cctcctggag ggccaggaat cgggccgggg gttgggccag gctctgaggt gtgggggatt   180
cccccatgcc ccccgccgta tgagttctgt gggggggatgg cgtactgtgg gccccaggtt   240
ggagtggggc tagtgcccca aggcggcttg gagacctctc agcctgaggg cgaagcagga   300
gtcggggtgg agagcaactc cgatgggggcc tccccggagc cctgcaccgt caccccctggt   360
gccgtgaagc tggagaagga gaagctggag caaaacccgg aggagtccca ggacatcaaa   420
gctctgcaga aagaactcga gcaatttgcc aagctcctga agcagaagag gatcaccctg   480
ggatatacac aggccgatgt ggggctcacc ctgggggttc tatttgggaa ggtattcagc   540
caaacgacca tctgccgctt tgaggctctg cagcttagct tcaagaacat gtgtaagctg   600
cggcccttgc tgcagaagtg ggtggaggaa gctgacaaca atgaaaatct tcaggagata   660
tgcaaagcag aaaccctcgt gcaggcccga aagagaaagc gaaccagtat cgagaaccga   720
gtgagaggca acctggagaa tttgttcctg cagtgcccga aacccacact gcagcagatc   780
agccacatcg cccagcagct tgggctcgag aaggatgtgg tccgagtgtg gttctgtaac   840
cggcgccaga agggcaagcg atcaagcagc gactatgcac aacgagagga ttttgaggct   900
gctgggtctc ctttctcagg gggaccagtg tcctttcctc tggccccagg gccccatttt   960
ggtacccgag gctatgggag ccctcacttc actgcactgt actcctcggt cccctttccct  1020
gaggggaaag cctttcccccc tgtctccgtc accactctgg gctctcccat gcattcaaac  1080
tgaggtgcct gccctctagt ttacgcgtgg gggcggccgg ccgcttttctc gaggccatcg  1140
atgtttaaac gatccgcccc tctccctccc cccccctaa cgttactggc cgaagccgct  1200
tggaataagg ccggtgtgcg tttgtctata tgttattttc caccatattg ccgtcttttg  1260
gcaatgtgag ggcccggaaa cctgccctg tcttcttgac gagcattcct aggggtcttt  1320
ccctctcgc caaaggaatg caaggtctgt tgaatgtcgt gaaggaagca gttcctctgg  1380
aagcttcttg aagacaaaca acgtctgtag cgacccttttg caggcagcgg aaccccccac  1440
ctggcgacag gtgcctctgc ggccaaaagc cacgtgtata agataccct gcaaaggcgg  1500
cacaacccca gtgccacgtt gtgagttgga tagttgtgga aagagtcaaa tggctctcct  1560
caagcgtatt caacaagggg ctgaaggatg cccagaaggt accccattgt atgggatctg  1620
atctggggcc tcggtacaca tgctttacat gtgtttagtc gaggttaaaa aaacgtctag  1680
gccccccgaa ccacggggac gtggttttcc tttgaaaaac acgatgataa atggccacac  1740
cgcgaattaa ttcgattccg catgtacaac atgatggaga cggagctgga gccgccggcc  1800
ccgcagcaaa cttcggggg cggcggcggc aactccaccg cggcggcggc cggcggcaac  1860
cagaaaaaca gcccggaccg cgtcaagcgg cccatgaatg ccttcatggt gtggtcccgc  1920
gggcagcggc gcaagatggc ccaggagaac cccaagatgc acaactcgga gatcagcaag  1980
cgcctgggcg ccgagtggaa acttttgtcg gagacggaga agcggccgtt catcgacgag  2040
gctaagcggc tgcgagcgct gcacatgaag gagcacccgg attataaata ccggccccgg  2100
cggaaaacca agacgctcat gaagaaggat aagtacacgc tgcccggcgg gctgctggcc  2160
cccggcggca atagcatggc gagcgggtc ggggtgggcg ccggcctggg cgcgggcgtg  2220
aaccagcgca tggacagtta cgcgcacatg aacggctgga gcaacggcag ctacagcatg  2280
atgcaggacc agctgggcta cccgcagcac ccgggcctca tgcgcacgg cgcagcgcag  2340
atgcagccca tgcaccgcta cgacgtgagc gcctgcagt acaactccat gaccagctcg  2400
cagacctaca tgaacggctc gcccacctac agcatgtcct actcgcagca gggcacccct  2460
ggcatggctc ttgctccat gggttcgtg gtcaagtccg aggccagctc cagcccccct  2520
gtggttacct cttcctccca ctccaggcg ccctgccagg ccggggacct ccgggacatg  2580
atcagcatgt atctccccgg cgccgaggtg ccggaacccg ccgccccag cagacttcac  2640
atgtcccagc actaccagag cggccgtgg cccggcacgg ccattaacgg cacactgccc  2700
```

-continued

```
ctctcacaca tgtga                                                    2715
SEQ ID NO: 2            moltype = DNA  length = 1452
FEATURE                 Location/Qualifiers
source                  1..1452
                        mol_type = other DNA
                        organism = synthetic construct
SEQUENCE: 2
atgcaccaaa agagaactgc aatgtttcag gacccacagg agcgacccag aaagttacca    60
cagttatgca cagagctgca aacaactata catgatataa tattagaatg tgtgtactgc    120
aagcaacagt tactgcgacg tgaggtatat gactttgctt ttcgggattt atgcatagta    180
tatagagatg ggaatccata tgctgtatgt gataaatgtt taaagtttta ttctaaaatt    240
agtgagtata gacattattg ttatagtttg tatggaacaa cattagaaca gcaatacaac    300
aaaccgttgt gtgatttgtt aattaggtgt attaactgtc aaaagccact gtgtcctgaa    360
gaaaagcaaa gacatctgga caaaaagcaa agattccata atataagggg tcggtggacc    420
ggtcgatgta tgtcttgttg cagatcatca agaacacgta gagaacccca gctgtaaggt    480
gcctgccctc tagtttacgc gtgggggcgg ccggccgctt tctcgaggcc atcgatgttt    540
aaacgatccg ccctctccc tcccccccc ctaacgttac tggccgaagc cgcttggaat    600
aaggccggtg tgcgtttgtc tatatgttat tttccaccat attgccgtct tttggcaatg    660
tgagggcccg gaaacctggc cctgtcttct tgacgagcat tcctagggggt ctttcccctc    720
tcgccaaagg aatgcaaggt ctgttgaatg tcgtgaagga agcagttcct ctggaagctt    780
cttgaagaca aacaacgtct gtagcgaccc tttgcaggca gcggaacccc ccacctggcg    840
acaggtgcct ctgcggccaa aagccacgtg tataagatac acctgcaaag gcggcacaac    900
cccagtgcca cgttgtgagt tggatagttg tggaaagagt caaatggctc tcctcaagcg    960
tattcaacaa ggggctgaag gatgcccaga aggtacccca ttgtatggga tctgatctgg    1020
ggcctcggta cacatgcttt acatgtgttt agtcgaggtt aaaaaaacgt ctaggccccc    1080
cgaaccacgg ggacgtggtt ttcctttgaa aaacacgatg ataaatggcc acaccgcgaa    1140
ttaattcgat tccgcatgca tggagataca cctacattgc atgaatatat gttagatttg    1200
caaccagaga caactgatct ctactgttat gagcaattaa atgacagctc agaggaggag    1260
gatgaaatag atggtccagc tggacaagca gaaccggaca gagcccatta caatattgta    1320
accttttgtt gcaagtgtga ctctacgctt cggttgtgcg tacaaagcac acacgtagac    1380
attcgtactt tggaagacct gttaatgggc acactaggaa ttgtgtgccc catctgttct    1440
cagaaaccat aa                                                       1452
```